Figure 6:
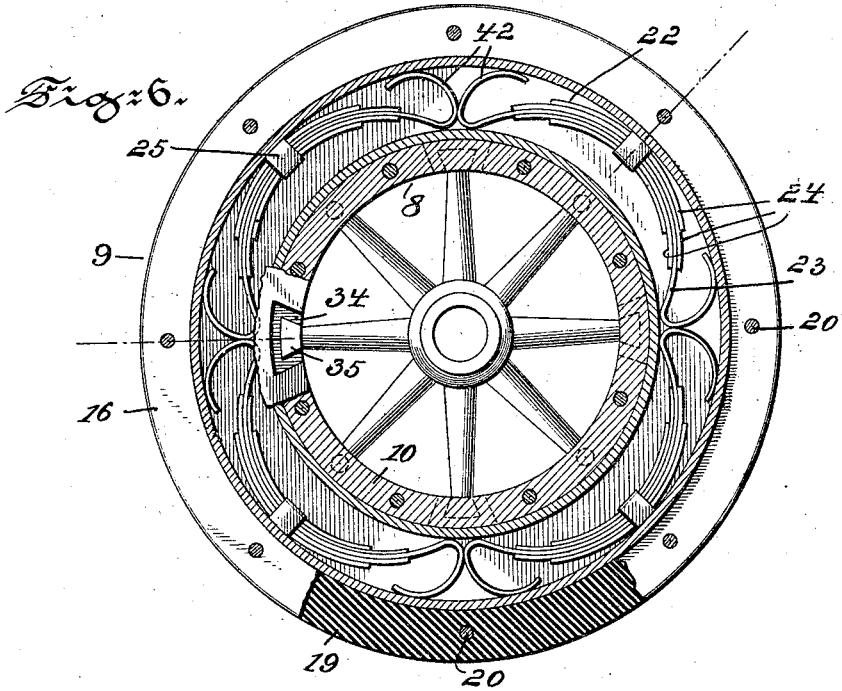
Figure 7:
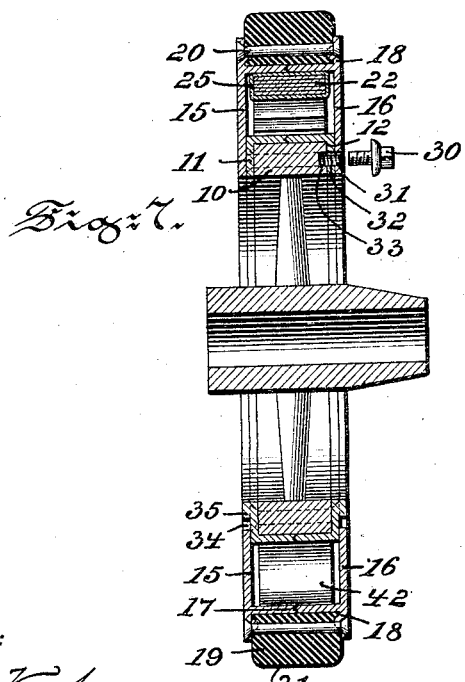

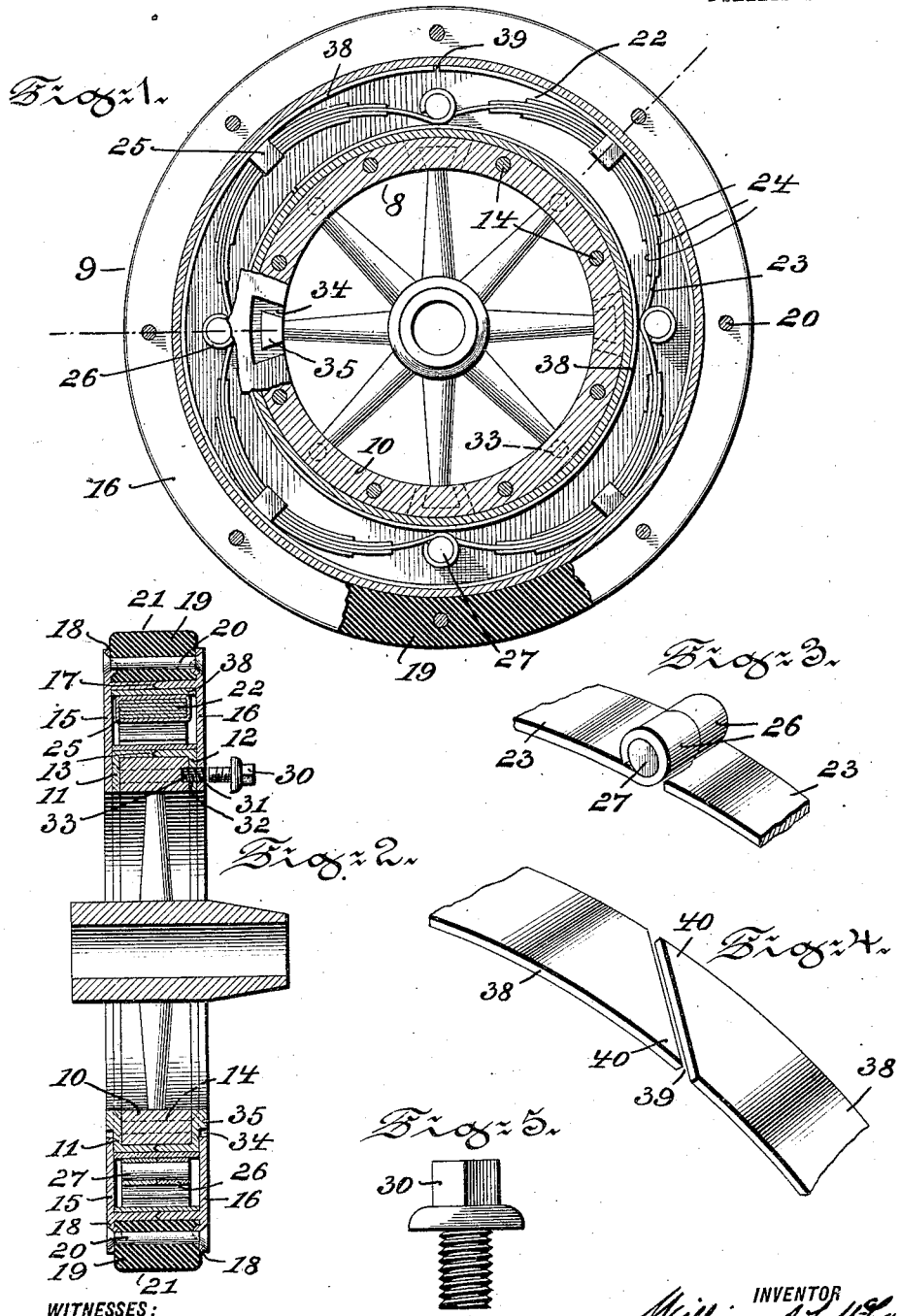

No. 852,893. PATENTED MAY 7, 1907.
W. A. F. McCALLUM.
WHEEL FOR MOTOR VEHICLES.
APPLICATION FILED JAN. 3, 1907.

2 SHEETS—SHEET 2.

WITNESSES:
Wilhelm Vogt
Thomas M. Smith

INVENTOR
William A. F. McCallum
BY
J. Walter Douglas
ATTORNEY.

UNITED STATES PATENT OFFICE.

WILLIAM A. F. McCALLUM, OF PHILADELPHIA, PENNSYLVANIA.

WHEEL FOR MOTOR-VEHICLES.

No. 852,893.　　　　Specification of Letters Patent.　　　　Patented May 7, 1907.

Application filed January 3, 1907. Serial No. 350,562.

*To all whom it may concern:*

Be it known that I, WILLIAM A. F. MCCALLUM, a citizen of the United States, residing at Germantown, in the city of Philadelphia, in the county of Philadelphia and State of Pennsylvania, have invented certain new and useful Improvements in Wheels for Motor-Vehicles, of which the following is a specification.

My invention has relation to wheels for motor vehicles formed of two sections arranged concentrically to each other; and in such connection it relates more particularly to resilient means and friction means for the same interposed between the wheel sections and of sectional means for surrounding the tires of the respective wheel sections.

The principal objects of my invention are first, to provide the wheel with springs which when interposed between the contiguous faces of the wheel sections are capable of offering the same resistance when pressure in the rotation of the wheel is brought to bear alternately from opposite sides on the springs; second, to so connect the springs with each other that the load carried by the wheel is evenly distributed and sustained by all the springs of the wheel; third, to interpose between the springs and the wheel sections yielding rings to prevent the direct engagement of the wheel sections by the springs and of the rattling between the sections; fourth, to provide the wheel with sectional casings to respectively surround the felly of the inner section of the wheel and to form a support for a solid yielding tire, which owing to the outline in cross section prevents skidding of the wheel on the road; and fifth, to provide the wheel with emergency bolts which in case of breaking of one or more springs permits of locking of the wheel sections to each other.

The nature and scope of my invention will be more fully understood from the following description taken in connection with the accompanying drawings forming part hereof, in which Figure 1, is a view, illustrating partly in side elevation and partly in section a wheel, springs pivotally connected with each other and having a series of short leaves disposed on each side of the long leaf thereof interposed between the wheel sections, combined bearing and anti-rattling rings interposed between the springs and the wheel sections, and means for movably connecting the wheel-sections with each other, all embodying main features of my invention. Fig: 2, is a cross-sectional view of the wheel and illustrating the manner of rigidly connecting the wheel sections by emergency bolts. Fig: 3, is a detail view, enlarged, illustrating perspectively the pivotally connected end portions of two springs. Fig: 4, is a similar view, illustrating the obliquely slotted portion of one of the combined bearing and anti-rattling rings. Fig: 5, is a detail view enlarged, illustrating in side elevation one of the threaded emergency bolts. Fig: 6, is a view illustrating partly in side elevation and partly in section a wheel with modified springs interposed between the sections; and Fig: 7, is a cross-sectional view thereof.

Referring to the drawings 8, represents the inner section and 9, the outer section of the wheel.

10 is the felly of the inner section preferably made of wood which is surrounded by a metal casing substantially U-shape in cross-section, consisting of sections 11 and 12, which at their abutting portions 13, are respectively provided with a V-shaped depression and a similarly shaped projection which latter by engaging the depression holds the sections in proper position to each other and prevents displacement thereof at these portions. The sections 11 and 12, of the casing by means of bolts 14, are securely connected with each other and with the felly 10. The outer section 9, of the wheel consists of an annular metal casing which in order to surround the inner wheel sections 10, is likewise made of two sections 15 and 16, held together at their abutting portions 17, by a V-shaped projection of one section engaging a similarly shaped depression of the other section. Each of the sections 15 and 16, is provided with a projection 18, partially surrounding a solid rubber tire 19, placed between the same, which is connected to the sections and the sections with each other by bolts 20, passing through the projections 18, of the sections 15 and 16, and through the tire 19, thereof. The tire 19, is provided with a flat face 21, which by coming in contact with a road-bed affords owing to its wide surface, the necessary grip on the same to prevent skidding or sidewise movement of the wheel thereon. Between the sections 11 and 12, and 15 and 16, of the casings of the inner and outer sections 8 and 9, are placed springs 22, each consisting of long leaves 23, at both sides of which are placed leaves 24, of gradually decreasing length, which by means of clamps 25, are secured to the long leaves 23. The long leaves 23, at their ends are bent so as to form eyes 26, for the reception of bolts 27, which in conjunction with the eyes 26, pivotally connect the leaves 23, and thus the springs 22, with each other, as shown in Figs: 1 and 3. Each of the springs 22, bears with the free ends against the inner section 8, and at the outer central curved portion against the outer section 9, thus holding the sections 8 and 9, in proper position with respect to each other and at the same time by their resiliency permit of the dispensing with an inflated or air cushioned tire, and permitting of the use of a solid rubber tire 19. Moreover, the springs 22, by being placed loosely between the sections 8 and 9, of the wheel, are permitted to freely expand and contract between the same under the pressure of a load carried by the inner section 8, of the wheel. By the connection of the springs 22, with each other, the weight of the load is evenly distributed over all the springs 22, in that one or two springs 22, when expanded under the pressure exerted thereon by the inner section 8, will by their movement compress the other springs, which by resisting this expansion will assist the expanded springs in the carrying of the load. By the arrangement of shorter spring leaves 24, on the inner side of the long spring leaf 23, the resistance offered by the springs 22, by the compression thereof will be equal to the resistance offered by the same by the expansion of the springs, in which instance the shorter leaves 24, on the outer side of the long leaf 23, are expanded. Thus the springs 22, whether expanded or contracted will offer the same amount of resistance and by the even distribution of the load over all the springs 22, the danger of breaking the same is greatly reduced. If, however, one or more of the springs 22, should break, the sections 8 and 9, of the same, can be readily maintained in their proper position by threaded bolts 30, which by passing through threaded openings 31 and 32, arranged in the sections 12 and 16, of the casings and by entering a threaded depression 33, in the felly 10, permit of a rigid connection of the wheel sections with each other. As shown in Fig: 2, the sections 8 and 9, of the wheel can thus be readily locked, which locking, however, as hereinbefore stated takes place only in a case of emergency for which reason the threaded bolts 30, may be properly termed "emergency bolts." In order to transmit the rotary movement of the inner wheel section 8, to the outer section 9, the section 16, of the casing of the outer wheel section 9, is provided with an opening or cut out portion 34, which is engaged by a projection 35, preferably formed integral with the section 12, of the casing of the inner wheel section 8. As shown in Figs: 1 and 6, the opening 34, is of sufficient width and depth to permit of the free movement of the inner section 8, in the outer section 9, without limiting the same by the projection 35, contacting with the section 16, of the casing of the outer wheel section 9.

In order to prevent the wear of the U-shaped casings surrounding respectively the felly 10, and forming in conjunction with the tire 19, the outer wheel section 9, by the springs 22, between the same and casings, are placed rings 38, preferably formed of steel. These rings 38, are rendered yielding by being split and by obliquely splitting the ring there will be formed overlapping portions 40, in the split portion 39, of the same, which prevents contacting of the springs 22, with the wheel section 8 or 9, when the springs with one of their ends or with their central curved portion rests directly upon the split portion 39, of the ring 38. Moreover, the rings 38, being yielding prevents rattling of the same between the wheel sections 8 and 9, in that the inner ring by the springs will be held in snug engagement with the inner section 8, while the outer ring will snugly surround the springs.

Instead of connecting the springs 22, with each other, to transmit the movement of one to the other the same result may be obtained by permitting the springs to merely abut against each other, as shown in Fig: 6. To prevent the creeping of the end portions of the springs 22, upon each other when the same are expanded or contracted under the pressure of a load, the long leaf 23, is provided with extensions 42, curving upward and then laterally to permit the spring leaf 23, to also bear against the outer wheel section 9. An additional spring 42, is thus formed, which securely holds the leaf 23, of the spring 22, with its end portion in engagement with the inner wheel section 8, and moreover, effectually prevents the sliding of the end portions of the springs one upon the other.

In instances where the sections 11 and 12, and 15 and 16, of the casings of the outer and inner wheel sections 8 and 9, are formed of material offering great resistance to wear, the rings 38, forming bearings and anti-rattling means for the springs 22, may be dispensed with, as shown in Fig: 6.

Having thus described the nature and objects of my invention, what I claim as new and desire to secure by Letters Patent is:—

1. A wheel having outer and inner sections arranged so as to provide an annular chamber between the same, a series of springs, each having a long leaf and leaves of decreasing lengths located on both sides of said long leaf, said series of springs mounted in said chamber unconnected with said sections, adapted to respectively expand and contract by pressure exerted thereon.

2. A wheel having outer and inner sections arranged so as to provide an annular chamber between the same, a series of springs, each having a long leaf and leaves of decreasing lengths located on both sides thereof, said springs contacting with each other and with the inner section at their ends, and with the outer section at intermediate portions to maintain said sections in proper position with respect to each other.

3. A wheel having concentric outer and inner sections arranged so as to form an annular chamber, a series of springs, each having a long leaf and leaves of gradually decreasing lengths located on both sides thereof, said springs pivoted to each other at their ends and unconnected with said sections but adapted to maintain said sections in proper position with respect to each other.

4. A wheel having concentrically arranged outer and inner sections, split rings engaging contiguous portions of said sections, springs interposed between the rings of said sections, said rings adapted when respectively expanded and contracted by said springs to prevent rattling of the same between said sections.

5. A wheel having concentrically arranged outer and inner sections, split rings engaging contiguous portions of said sections, springs interposed between said rings, said rings adapted to form bearings for said springs and prevent direct engagement of the sections with said springs.

6. A wheel having sectional casings, the outer of which is adapted to loosely engage the inner of said casings so as to be held in position by the same, a tire carried by the outer casing, a series of springs contacting with each other and the inner casing at their ends and with the outer casing intermediate of the ends to maintain said sections in proper position with respect to each other and a hub section having a tire or felly adapted to be engaged by the inner of said casings.

7. A wheel having sectional nested casings, the exterior of said casings forming an outer wheel section having openings and the inner section projections loosely engaging the openings of the outer section to permit of the transmitting of movement from the inner to the outer casing, a series of springs interposed between said casings and unconnected therewith, and each having a long leaf and leaves of decreasing lengths on both sides thereof, a tire carried by the outer of said casings and an inner wheel section having a tire or felly engaged by the inner of said casings.

8. A wheel having sectional nested casings, the exterior of said casings forming an outer wheel section having openings and the inner section projections loosely engaging the openings of the outer section to permit of the transmitting of movement from the inner to the outer casing, a series of springs interposed between said casings, each having a long leaf, and leaves of gradually decreasing lengths located on both sides of the long leaf.

9. A wheel having sectional nested casings, the exterior of said casings forming an outer wheel section having openings and the inner section projections loosely engaging the openings of the outer section to permit of the transmitting of movement from the inner to the outer casing, a series of leaf springs interposed between said casings and bearing at their ends against each other and said inner casing and at another portion intermediate of said ends against said outer casing, and the ends of each of said springs bent so as to form auxiliary springs adapted to prevent displacement of said ends.

10. A wheel having nested casings, the outer and inner of said casings having communicating openings, springs each having a long leaf and leaves of gradually decreasing lengths on both sides thereof mounted between said casings and unconnected therewith, said springs bearing at their ends against each other and one of said casings and at portions intermediate of said ends against the other of said casings and bolts adapted when one or more of the said springs are rendered inoperative to lock the casings together by passing into the openings of said casings.

In witness whereof, I have hereunto affixed my signature, in the presence of the two subscribing witnesses.

WILLIAM A. F. McCALLUM.

Witnesses:
J. WALTER DOUGLASS,
GEO. W. REED.